United States Patent [19]

Sugiyama et al.

[11] Patent Number: 4,525,823
[45] Date of Patent: Jun. 25, 1985

[54] OPTICAL TRACKING SYSTEM

[75] Inventors: Toshio Sugiyama; Hideo Suenaga, both of Toyokawa; Yukio Fukui, Yokohama, all of Japan

[73] Assignee: Hitachi, Ltd., Tokyo, Japan

[21] Appl. No.: 397,973

[22] Filed: Jul. 14, 1982

[30] Foreign Application Priority Data

Jul. 22, 1981 [JP] Japan .............................. 56-113679

[51] Int. Cl.³ .......................... G11B 21/10; G11B 7/00
[52] U.S. Cl. ........................................ 369/44; 250/202
[58] Field of Search ........................... 369/44, 109, 46; 250/202

[56] References Cited

U.S. PATENT DOCUMENTS

| | | | |
|---|---|---|---|
| 4,268,745 | 5/1981 | Okano | 369/44 |
| 4,338,682 | 7/1982 | Hosaka | 369/46 |
| 4,346,471 | 8/1982 | Hirosawa | 369/44 |
| 4,349,901 | 9/1982 | Howe | 369/109 |
| 4,408,314 | 10/1983 | Yokota | 369/46 |

FOREIGN PATENT DOCUMENTS 1451799 10/1976 United Kingdom .................. 369/44

Primary Examiner—Alan Faber
Attorney, Agent, or Firm—Antonelli, Terry & Wands

[57] ABSTRACT

A tracking system for optically tracking information tracks formed on a recording medium, comprising a comparator which generates a trigger signal when the light beam scanning the information track is located over an information pit, and a sample holding circuit which samples a deviation signal caused by the difference of reflection light intensities on two photo detectors at that time. The deviation signal obtained when the light beam is located over the information pit includes smaller error component caused by the displacement of the object lens during the tracking control, whereby the accurate tracking control can be achieved.

12 Claims, 10 Drawing Figures

OPTICAL TRACKING SYSTEM

BACKGROUND OF THE INVENTION

The present invention relates to a tracking system which optically follows an information track provided on a recording medium and, more particularly, to an optical tracking system which operates by utilization of a light beam reflected on the track on a disk used in optical recording and reproducing apparatus.

In disk-type optical recording and reproducing apparatus such as a video disk player and a PCM audio disk player, the information track needs to be tracked at the center accurately. There is known a method of detecting the center of the track, in which a pair of photo detectors with two sensing regions positioned in parallel to the track scanning direction are provided, and an incident light beam to the track, when it deviates from the track center, causes the reflection ray to be distributed asymmetrically on the detectors due to diffraction on the track.

Tracks are formed as a series of fine concaves called pits or convexes located apart from each other. When the incident light beam is located at the center of a pit, it diffracts and reflects at the pit and provides symmetric light intensities for the two photo detectors. If the incident light beam deviates from the pit center, the two photo detectors receive asymmetric light intensities from the pit. The photo detectors provide signals representing respective light intensities, and the signals are amplified by a differential amplifier, which provides a differential signal for driving a servo mechanism thereby to control the position of an object lens so that the light beam is kept at the center of the pit.

With the object lens situated in a zero-deflection state, the center of the reflection ray is located at the mid point of both photo detectors. However, if the object lens deviates during the tracking control, the center of the reflection ray will deviate from the mid point of the photo detectors, providing different light intensities for the detectors. This difference depends on the amount of displacement of the reflection ray and provides an error component for the deviation signal generated from the differential amplifier. This error component is so large that tracking control fails to maintain accurate tracking.

SUMMARY OF THE INVENTION

It is an object of the present invention to provide an optical tracking system which significantly reduce the deviation of the detection signal caused by the displacement of the light beam during the tracking control thereby to achieve accurate tracking.

According to the invention, the intensity of the reflection ray is sensed only when the incident light beam scans the pit, and the deviation signal is produced from the difference of light intensities on the photo detectors. During the scanning of the information track, the incident light beam located over a pit provides a low-intensity reflection ray for the photo detectors due to diffraction by the pit, while the incident light beam located over the flat portion between two pits provides a high-intensity reflection ray for the detectors. According to the invention, the decrease in the light intensity on the photo detectors is detected and the deviation signal for driving the servo mechanism is produced from the difference of light intensities on at least two photo detectors.

DESCRIPTION OF THE PREFERRED EMBODIMENT

Figure 1:
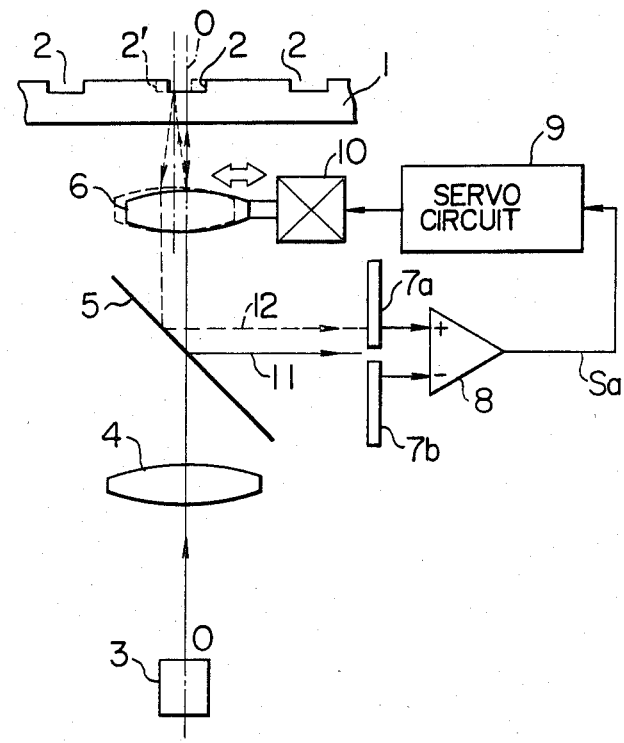
FIG. 1 is a block diagram showing the prior art tracking system.

For an easy understanding of the present invention, the prior arr tracking system will first be described with reference to FIG. 1.

Figure 2:
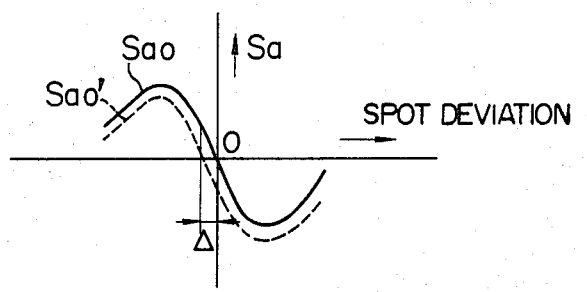
FIG. 2 is a graphical representation showing the characteristics of the deviation signal used for the tracking control.

In the figure, an optical disk 1 is provided with information tracks in the form of pits 2. A light beam derived from a light source 3 goes through a coupling lens 4 and half-mirror 5, and converges through an object lens 6 to form a fine light spot with a diameter of around 1 $\mu$m on the information surface of the disk. With the light spot located on the track 2, a reflected diffraction light pattern including track information is generated. The reflection ray goes back via the convergent lens 6 and half-mirror 5, so that it is received by two photo detectors 7a and 7b. When the incident light beam is positioned at the center of the track 2, the two photo detectors 7a and 7b receive equal light intensities, and if the incident light beam deviates from the center of the track 2, the photo detectors 7a and 7b receive asymmetric light intensities. The outputs of the photo detectors 7a and 7b are received by a differential amplifier 8, which provides the difference of the inputs to form a deviation signal Sa for use in tracking control as shown in FIG. 2. The signal Sa is fed to a servo circuit 9, which controls an actuator 10 for driving the convergent lens 6, so that the incident light beam is kept positioned at the center of the track 2.

Figure 3A:
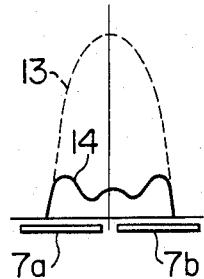
FIGS. 3A—3E are illustrations showing the distribution of the reflection light intensity on the photo detectors.
Figure 3B:
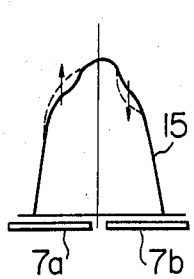
Figure 3C:
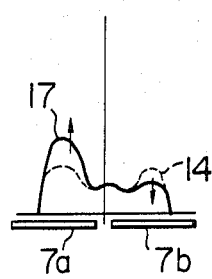

FIGS. 3A—3E show light intensity distributions on the photo detectors with various spatial relationship between the incident light beam and the detectors. In FIG. 3A, curve 13 (dashed curve) shows the distribution when the light spot is located out of the pit, and curve 14 (solid curve) shows the distribution when the light spot is located at the center of the pit. During the reproducing operation for a video disk or PCM audio disk, the distribution patterns 13 and 14 are created alternately in a frequency of several hundred kHz to several MHz, and the main information is reproduced as a time function. The tracking control needs a frequency band (servo band) of DC to 10 kHz, which is lower than the band for the main information. Accordingly, the servo band is sensitive to the difference of light intensities on the photo detectors 7a and 7b in the track traversing direction, but it does not respond to individual pits. In consequence, the differential amplifier 8 is responsive to distribution curve 15 in FIG. 3B which represents the mesh value for the distribution curves 13 and 14 in FIG. 3A. The dashed curve portions in FIG. 3B indicate the light distribution when the beam spot deviates from the track center and, similarly, solid curve 17 in FIG. 3C indicates the light distribution with the beam spot located out of the track center.

Figure 3D:
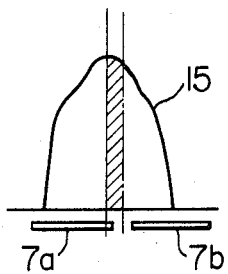
Figure 3E:
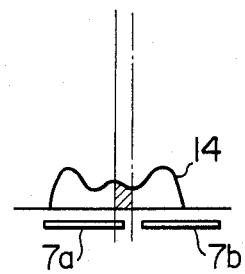

Reference again to FIG. 1, when the convergent lens 6 is centered on the optical axis 0—0 of the coupling lens 4, the reflection ray is directed to the mid point of the photo detectors 7a and 7b through the path shown by the solid line 11. However, if the convergent lens 6 is displaced due to the tracking operation, the reflection ray is diverted on the photo detectors 7a and 7b in proportion to the displacement of the lens as shown by the dashed line 12. FIG. 3D depicts the distribution of the light intensity on the photo detectors 7a and 7b for the diverted ray, where the hatched portion in the distribution pattern represents the error component which gives rise to the deviation signal Sa responsive to the displacement of the convergent lens 6. The error component offsets the deviation signal as shown by Sao' in FIG. 2. The deviation of the beam path caused by the displacement of the convergent lens 6 can be too large to maintain the accurate tracking. FIG. 3E depicts the case where the convergent lens 6 is displaced during the tracking control, with the beam spot located over the pit. In the figure, the hatched portion represents the deviation caused by the displacement of the lens 6. The comparison of FIGS. 3D and 3E shows that the case of FIG. 3E results in a far smaller ratio of the deviation component to the overall light intensity on the photo detectors. In this case, even if the convergent lens 6 is displaced during the tracking control, its effect on the light distribution on the detectors can be minimized. Thus, it can be appreciated that the outputs of the photo detectors should be accepted only when the beam spot is located over the pit.

Figure 4:
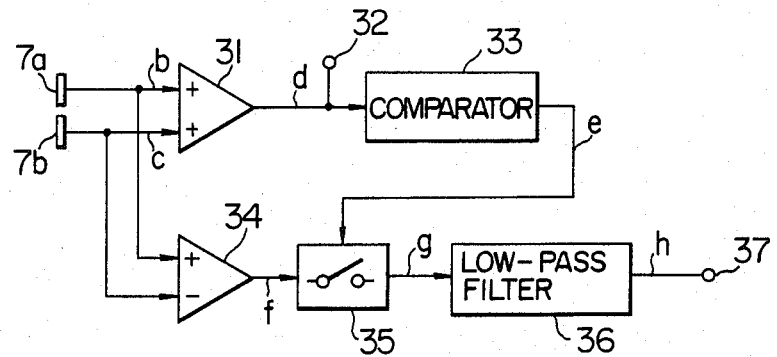
FIG. 4 is a block diagram showing an embodiment of the tracking system according to the present invention.
Figure 5:
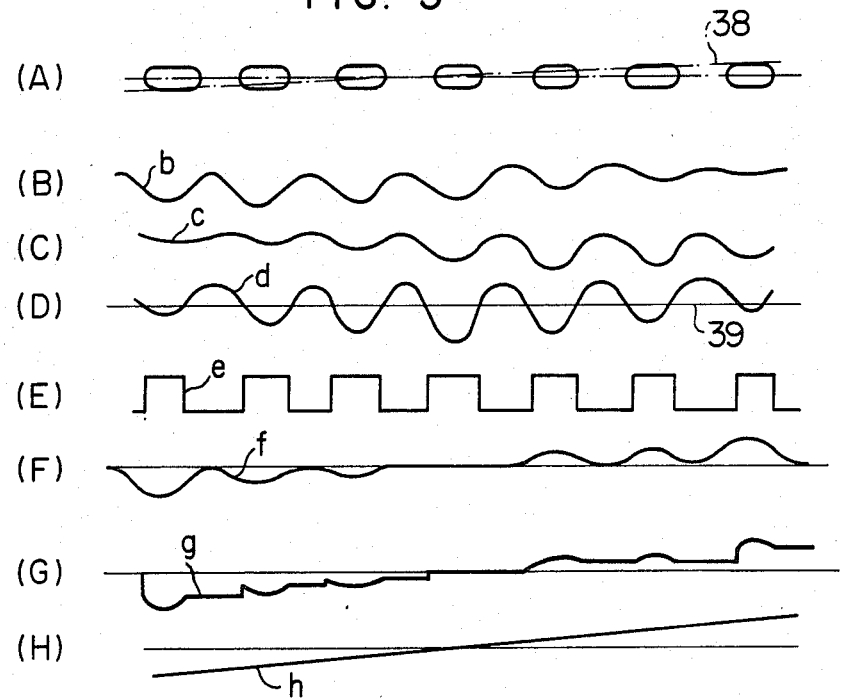
FIG. 5, consisting of A-H, is a set of waveform diagrams for signals observed at various portions on the block diagram shown in FIG. 4.

FIG. 4 is a block diagram showing an embodiment of the invention, and FIG. 5 shows waveforms observed at various portions of the arrangement. A pair of photo detectors 7a and 7b disposed across the track provide outputs, which are added by an adder 31, and the resultant output signal including the main information is sent through a terminal 32 to a signal processing circuit (not shown). The outputs of the detectors 7a and 7b are at the same time fed to a differential amplifier 34, with the differential output thereof being derived to a sample holding circuit 35. The sample holding circuit 35 is supplied with a trigger signal which is produced by a comparator 33 basing on the output of the adder 31. The output of the sample holding circuit 35 is fed through a low-pass filter 36 having a bandwidth necessary for the servo control, and sent through a terminal 37 to a servo circuit (not shown).

The following will decribe the waveforms of various signals when the beam spot scans the track transversely. Diagram (A) shows a track, and the dot-and-dashed line 38 is the center line of the trace of the beam spot. Diagrams (B) and (C) show the outputs b and c of the detectors 7a and 7b, respectively. These diagrams show that a smaller difference between top and bottom of the waveform occurs when the center of the spot is not located at the center of the pit. Diagram (D) shows the output d of the adder 31, and the signal has a small magnitude when the beam spot coincides with each pit. Line 39 is the reference level for the operation of the comparator 33. The reference level is determined such that the comparator 33 provides an output e at each lower portion of the signal d when the beam spot is located over the pit. The sample holding circuit 35 operates in response to the output e of the comparator 33, thereby providing a deviation signal at a time when the light spot is located over the pit. The output f of the differential amplifier 34 is sampled and held in response to the output signal e of the comparator, and the sample holding circuit 35 provides an output g which is the deviation signal at a time when the beam spot is located over the pit. Finally, the deviation signal is fed through the low-pass filter 36 and a track detection signal h having frequency components in the servo band is obtained and supplied to the servo circuit.

The effect of the present invention can be enhanced by holding the differential output d at the center of each pit. The arrangement for this modification can easily be realized by employment of a peak detecting circuit in place of the comparator 33.

Figure 6:
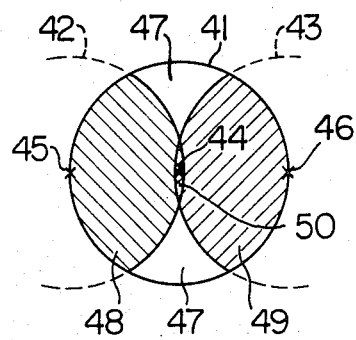
FIG. 6 shows the cross-section of the reflection ray on the photo detectors.

The following will describe the distribution of light intensity on the photo detectors produced by the ray reflected on the track. The optical disk can be considered as a diffraction grating, since tracks are formed at a constant pitch which is substantially equal to the diameter of the beam spot. Generally, the distribution of the reflection ray on the photo detectors consists of a 0th order and ±1st order diffraction rays as shown in FIG. 6. The 0th order ray 41 signifies that the lens has a circular aperture, and this ray appears when the beam spot is located out of the pit. The 0th order ray has a center shown by 44. The ±1st order rays 42 and 43 appear when the beam spot is diffracted by the pit, and they have respective centers shown by 45 and 46. The distances between the centers 44 and 45, and 44 and 46 are determined from the wavelength of the light, the track pitch, and the numerical aperture of the lens. FIG. 6 shows an example, where the track pitch is 1.6 $\mu$m, the light wavelength is 7800 Å, and the numerical aperture is 0.5. In some particular cases, the ±1st order rays coincide with each other in the central portion of the 0th order ray as shown by 50. When the beam spot is located at the center of the track (pit), the amount of light in the regions 48 and 49 decreases, while the amount of light in the region 47 does not decrease significantly. When the beam spot deviates from the track (pit), the outside portions of the regions 48 and 49 vary asymmetrically. Accordingly, the deviation of tracking can be detected effectively by comparing the intensities in the regions 48 and 49. Furthermore, it is advantageous to avoid the region 47 whese a relatively large amount of light intensity falls on, for detecting the light intensity distribution, on both the detectors, which deviated in a transverse direction (perpendicular to the track). It is further advantageous for reducing the detection error component to position the photo detectors corresponding to the regions where the 0th order ray and ±1st order rays overlap as shown by hatching in FIG. 6.

In the foregoing embodiment, the photo detectors are used commonly for detecting the track position and for sensing the main information. However, they may be provided separately. Moreover, four-division photo sensors may be used instead of the two-division photo sensors as described above. The present invention contemplates to reduce the detection error component by sampling the reflection ray intermittently, and thus it is not limited to be applied to the tracking control, but can be applied to the focusing control without departing from the spirit of the invention.

We claim:

1. An optical tracking system comprising:
   a recording medium having information pits located apart from each other;
   an optical system which projects a light beam from a light source onto said recording medium and collects the reflection ray from said recording medium;
   a light sensitive means for detecting said reflection ray; and
   a control means which samples the output of said light light sensitive means intermittently and controls said optical system so that said light beam scans the central portions of said information pits, said control means including;
   a comparator which generates a trigger signal indicating that said light beam is scanning a pit in response to said reflection ray with its intensity detected by said light sensitive means lower than a predetermined level, and
   a sample holding circuit which samples the output of said light sensitive means in response to said trigger signal.

2. An optical tracking system according to claim 1, wherein said control means samples the electrical output of said light sensitive means caused by a reflected diffraction ray produced when said light beam is scanning said information pit.

3. An optical tracking system according to claim 2, wherein said control means controls said optical system on the result of said sampling so that said light beam scans the central portions of said information pits.

4. An optical tracking system according to claim 1, wherein said light sensitive means comprises at least two photo detectors located across a line parallel to the alignment of said information pits.

5. An optical tracking system according to claim 4, wherein said photo detectors each detect ±1st order reflected diffraction rays produced by said information pit.

6. An optical tracking system according to claim 4, wherein said photo detectors have respective light sensitive regions corresponding to areas where the 0th order and ±1st order reflected diffraction rays produced by said information pit overlap.

7. An optical tracking system according to claim 1, further comprising a low-pass filter which extracts signal components having a servo frequency band from the output signal of said sample holding circuit.

8. An optical tracking system according to claim 1, wherein said control means intermittently samples the output of said light sensitive means during the period of operation of said optical tracking system, said control means continuously controlling said optical system in accordance with the intermittent sampled output of said light sensitive means so that said light beam scans the central portion of said information pits during the period of operation of said optical tracking system.

9. An optical tracking system according to claim 8, wherein said control means includes servo means in a closed servo loop of said optical tracking system during the period of operation of said optical tracking system for continuously positioning said optical system in accordance with the intermittent sampled output of said light sensitive means so that said light beam scans the central portion of said information pits during the period of operation of said optical tracking system.

10. An optical tracking system according to claim 8, wherein said control means samples the output of said light sensitive means only when said light beam scans respective ones of said information pits so as to intermittently sample the output of said light sensitive means during the period of operation of said optical tracking system for enabling accurate tracking positioning of the optical system in response to the sampled output.

11. An optical tracking system comprising:
    a recording medium having information pits located apart from each other;
    an optical system which projects a light beam from a light source onto said recording medium and collects the reflection ray from said recording medium;
    a light sensitive means for detecting said reflection ray; and
    a control means which samples the output of said light sensitive means intermittently and controls said optical system so that said light beam scans the central portions of said information pits, said control means including;
    a peak detecting circuit which generates a trigger signal indicating that said light beam is scanning the center of a pit in response to said reflection ray with its intensity detected by said light sensitive means pointing the minimum value within the variation cycle, and
    a sample holding circuit which samples the output of said light sensitive means in response to said trigger signal.

12. An optical tracking system according to claim 11, further comprising a low-pass filter which extracts signal components having a servo frequency band from the output signal of said sample holding circuit.

* * * * *